United States Patent [19]
Skuce et al.

[11] 3,815,252
[45] June 11, 1974

[54] MANUFACTURE OF DYESTUFF POWDERS

[75] Inventors: William Frederick Skuce; David Hugh Spence; Stuart Anthony Whitefoot, all of Manchester, England

[73] Assignee: Imperial Chemical Industries, Limited, London, England

[22] Filed: Jan. 19, 1973

[21] Appl. No.: 324,971

[30] Foreign Application Priority Data
Jan. 26, 1972  Great Britain.................... 3682/72

[52] U.S. Cl.............................. 34/8, 34/9, 34/10
[51] Int. Cl............................... F26b 5/08
[58] Field of Search........................ 34/8, 9, 10

[56] References Cited
UNITED STATES PATENTS
3,349,500  10/1967  Wall........................ 34/10
3,414,980  12/1968  Nezbed...................... 34/9
3,477,874  11/1969  Repsdorph et al............. 34/10 X

*Primary Examiner*—John J. Camby
*Attorney, Agent, or Firm*—Cushman, Darby & Cushman

[57] ABSTRACT

A process for drying water-soluble dyestuffs to give free-flowing powders of very low dust content which comprises feeding an aqueous suspension of the dyestuff to the disc of a centrifugal drier, said disc rotating with a peripheral speed of only 6,000–12,000 ft/minute contacting the resultant spray with heated air to evaporate the water, separating any fine dust which is formed from the coarser, particulate matter and returning the separated fine dust to the spraying zone.

2 Claims, 2 Drawing Figures

MANUFACTURE OF DYESTUFF POWDERS

This invention relates to improved dyestuff powders and to a process for their manufacture and is more particularly concerned with the manufacture of water-soluble dyestuffs in a free-flowing dry powder form which has little or no dustiness.

It is known that to obtain free-flowing non-dusting powders, it is essential to isolate the product concerned in the form of coarse particles. Nozzle driers can be used with suspensions of water-insoluble dyes for this purpose, but cannot conveniently be used for the drying of suspensions of water-soluble dyes since the nozzle usually blocks up unless the suspension is diluted to an extent which renders the drying step uneconomic. Centrifugal driers as commonly used, having peripheral speeds of 20–30,000 ft/min., give the dried product in the form of a fine powder which is very dusty.

It has now been found that water-soluble dyestuffs can be dried to give free-flowing powders of very low dust content using a centrifugal drier, by feeding the dyestuff suspension to the rotating disc moving with a peripheral speed of only 6,000 to 12,000 feet/min., separating any fine dust which is formed from the coarser, particulate matter and returning the separated fine dust to the spraying zone.

The term "disc" as used above includes not only flat discs but other rotors used in the centrifugal drier art, e.g., discs having an inverted saucer shape, discs with straight or curved vanes, and discs with concentric annular walls having circumferentially-spaced slots.

The new process can be applied to a wide range of water-soluble dyestuffs, e.g., acid dyes, cationic dyes, direct dyes and neutral-dyeing metal-complex azo dyes for wool, and is especially useful for the drying of water-soluble fibre-reactive dyes.

If desired, antidusting agents may be added to the dried dyestuff powder, in which case conventional antidusting agents e.g., butyl stearate, dodecyl benzene and kerosene may be used. It is preferred, however, in order to avoid mechanical handling of the dried powder, to add an antidusting agent of very low volatility to the dyestuff suspension before drying; as examples of antidusting agents which can be used in this connection, there may be mentioned long-chain alkyl di-esters of dibasic acids or long-chain esters of long chain fatty acids or mixtures of these, e.g., dinonyl phthalate, hexadecyl stearate and tridecyl stearate. Also to avoid mechanical handling it is preferred to adjust the dyeing strength of the dyestuff suspension with diluents known to the art e.g., dextrine, sodium chloride so that "standard" strength dyestuff composition is obtained directly from the dryer.

The spray of moist dyestuff paste is dried in the usual way by passing a stream of heated air into the drier. The inlet temperature of the air is limited only by the decomposition temperature of the dyestuff being dried, but in general the practical range has an upper limit of 400°C and the temperature used in any given instance should be such as to ensure an outlet temperature of at least 80°C.

The paste dried in this manner separates into two fractions, one of which is coarse and settles rapidly to the base of the drier; the remaining dried powder is very fine and remains in suspension in the flow of heated air. According to the present process this suspended fine powder is separated from the air stream by any convenient means and returned to the spray zone, e.g., by passage of the suspension into a cyclone separator and return of the solid, e.g., by pneumatic means through a pipe to be fed adjacent to the upper or lower surface of the disc.

The invention will now be illustrated by reference to the drawings accompanying this specification, in which.

Figure 1:
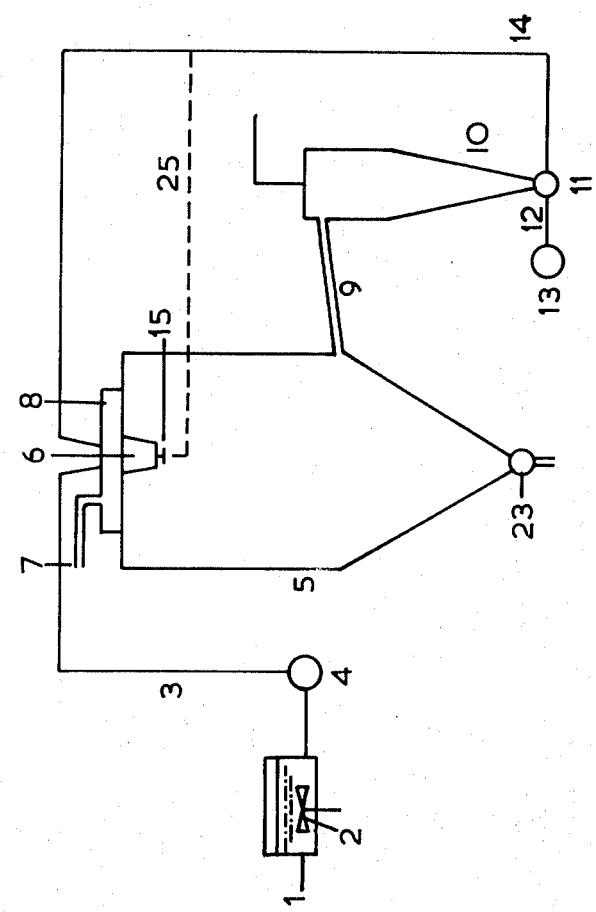
FIG. 1 is a generalized diagram of the apparatus used in the process.
Figure 2:
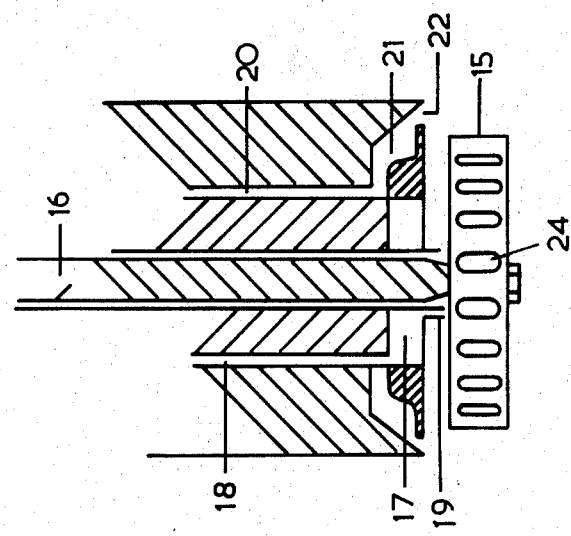
FIG. 2 is an enlarged view, partly in cross-section, of the disc rotor and feed arrangements for the dyestuff suspension and returned solid particles.

In the drawings, a tank 1 containing a high-shear agitator 2 is connected by a pipe 3 and pump 4 to an atomiser 6 mounted in a spray drying chamber 5 having a discharge valve 23. Hot air is supplied through a pipe 7 to an air distributor 8. An outlet pipe 9 for the heated air is connected to a cyclone separator 10, the discharge valve 11 of which is connected to pipes 12 and 14, the first of which is connected to an air blower 13 and the other is connected to the atomiser.

In the atomiser, a disc 15 is mounted on an axle 16 surrounding the lower end of which is a chamber 17 having an inlet passage 18 connected to pipe 3 and an outlet 19 feeding the rotor at a point adjacent the axle. A second passage 20 is connected to pipe 14 and opens into an annular chamber 21, having a circular slot 22 above and slightly outside the circumference of the disc. The disc itself is hollowed out (not shown) near the axle, and the wall of the hollow are connected by radial slots 24 to the circumference of the disc.

The dotted line 25 represents an alternative pipe for feeding the fine powder back to the spray zone.

In operating the process, the dyestuff suspension in tank 1 is liquidized by operating stirrer 2 and pumped through pipe 3 to passage 18 into chamber 17 whence it flows through outlet 19 on to the upper surface of the disc, rotating at a speed giving a peripheral speed of 6,000–12,000 ft/min. The suspension is forced out through slots 24 in the form of a spray which contacts the heated air and forms dry particles. The heavier, coarser particles fall to the base of the chamber and can be discharged through the valve 23.

The cooled air stream carrying finer particles of the dyestuff pass along pipe 9 into the cyclone 10 and solid particles fall to the base of this, from which a stream of compressed air provided by air blower 13 carries the particles along pipe 14 to passage 20. The particles then are carried into chamber 21 and discharged from the annular slot 22 into the wet spray spreading outwards from slots 24.

The following Examples in which parts and percentages are by weight, illustrate typical methods of obtaining substantially dust-free dyestuff powders by the new method:

EXAMPLE 1

A press-cake of the reactive dyestuff, C.I. Reactive Orange No. 14, is sampled and found to have a solids content of 40 percent.

The press cake is fluidized by a high shear mixer, then 0.3 percent (calculated on the dry weight) of a mixture of hexadecyl and heptadecyl stearates is added. The resultant fluid paste is subjected to the drying process described above, the particular details being as follows:

Disc diameter 210 mm; 36 slots in circumference
Speed of rotation 3,250 r.p.m. (peripheral speed 7,150 ft/min)
Feed rate approximately 110 gals/hr
Air inlet temperature 250°C
Air outlet temperature 120°C The resulting powder grains contain approximately 5 percent water.

EXAMPLE 2

928 parts of a press-cake of C.I. Acid Yellow 172 (solid content 61 percent) and 600 parts of water are fluidized by a high-speed, high-shear mixer and pumped to a tank fitted with a low speed stirrer. 140 parts of calcined Glauber's salt and 240 parts of water are added and the mixture is then dried under the conditions described in Example 1. The product is obtained in large, dust-free grains which are "standard" strength without further treatment.

EXAMPLE 3

1,000 parts of a press-cake of C.I. Acid Red 266 (solids content 35.7 percent) are fluidized as in previous Examples. 595 parts of dextrine and 320 parts of water are added and the mixture is dried under the conditions described in Example 1. The product is obtained in a grain form and is equal in strength to "standard" without further treatment.

EXAMPLE 4

1,031 parts of a press-cake of C.I. 24410 (solids content 39 percent) are fluidized as in previous Examples. 289 parts of sodium chloride and 80 parts of water are added and the mixture is dried under the conditions described in Example 1.

The product is obtained in a grain form and is equal in strength to "standard" without further treatment.

What we claim is:

1. A process for drying water-soluble dyestuffs to give free-flowing powders of very low dust content which comprises feeding an aqueous suspension of the dyestuff to the disc of a centrifugal drier, said disc rotating with a peripheral speed of only 6,000–12,000 ft/minute, evaporating the water in the resultant spray by contacting said spray with heated air, separating any fine dust which is formed from the coarser, particulate matter and returning the separated fine dust to the spraying zone.

2. A process as claimed in claim 1 which includes adding an anti-dusting agent to the aqueous dyestuff suspension.

* * * * *